United States Patent

Cordone

(10) Patent No.: US 10,608,760 B2
(45) Date of Patent: Mar. 31, 2020

(54) SYSTEMS AND METHODS FOR DETECTING SATELLITE-BASED COMMUNICATION INTERFERENCE

(71) Applicant: GOGO LLC, Chicago, IL (US)

(72) Inventor: Sean S. Cordone, Wheaton, IL (US)

(73) Assignee: GOGO LLC, Chicago, IL (US)

(*) Notice: Subject to any disclaimer, the term of this patent is extended or adjusted under 35 U.S.C. 154(b) by 0 days.

(21) Appl. No.: 16/263,814

(22) Filed: Jan. 31, 2019

(65) Prior Publication Data

US 2019/0319724 A1    Oct. 17, 2019

Related U.S. Application Data

(60) Provisional application No. 62/656,698, filed on Apr. 12, 2018.

(51) Int. Cl.
| | | |
|---|---|---|
| *H04B 17/345* | (2015.01) | |
| *H01Q 3/10* | (2006.01) | |
| *H04B 17/318* | (2015.01) | |
| *H04B 17/12* | (2015.01) | |
| *H04B 17/336* | (2015.01) | |
| *H01Q 3/24* | (2006.01) | |

(52) U.S. Cl.
CPC ............ *H04B 17/345* (2015.01); *H01Q 3/10* (2013.01); *H01Q 3/242* (2013.01); *H04B 17/12* (2015.01); *H04B 17/318* (2015.01); *H04B 17/336* (2015.01)

(58) Field of Classification Search
CPC .... H04B 17/345; H04B 17/309; H04B 1/715; H04B 17/318; H04B 17/336
See application file for complete search history.

(56) References Cited

U.S. PATENT DOCUMENTS

| | | |
|---|---|---|
| 7,091,906 B2 | 8/2006 | Chevalier et al. |
| 7,304,605 B2 | 12/2007 | Wells |
| 7,813,700 B2 | 10/2010 | Zheng et al. |
| 7,986,918 B2 | 7/2011 | Kontola et al. |
| 8,849,288 B2 | 9/2014 | Vilhar |
| 9,319,172 B2 | 4/2016 | Jalali et al. |
| 9,712,275 B2 | 7/2017 | Johnson et al. |
| 2017/0251381 A1 | 8/2017 | Buer et al. |
| 2019/0013566 A1* | 1/2019 | Merrell ............... H01Q 1/42 |

FOREIGN PATENT DOCUMENTS

| | | |
|---|---|---|
| WO | WO-2005/122328 A2 | 12/2005 |
| WO | WO-2017/151790 A1 | 9/2017 |

OTHER PUBLICATIONS

International Application No. PCT/US2019/026864, International Search Report and Written Opinion, dated Jun. 26, 2019.

* cited by examiner

*Primary Examiner* — Keith Ferguson
(74) *Attorney, Agent, or Firm* — Marshall, Gerstein & Borun LLP; Randall G. Rueth (57) ABSTRACT

Systems and methods for detecting and reducing signal interference affecting wireless communication with a mobile vehicle includes generating an interference signature based on a correlation multiple signal-quality characteristics of a desired target-signal that is received at an antenna assembly attached to the mobile vehicle, and adjusting the orientation of the antenna assembly based on a change or degradation in the interference signature to thereby improve wireless communication with the vehicle.

16 Claims, 6 Drawing Sheets

SYSTEMS AND METHODS FOR DETECTING SATELLITE-BASED COMMUNICATION INTERFERENCE

CROSS-REFERENCE TO RELATED APPLICATIONS

Priority is claimed to U.S. Provisional Application No. 62/656,698, filed Apr. 12, 2018, which is incorporated herein by reference in its entirety.

FIELD OF THE INVENTION

The following disclosure relates to systems and methods for detecting and reducing interference in wireless communication with a mobile vehicle.

BACKGROUND

A vehicle travelling over land, on sea, or through the air often engages in bidirectional communication within a communication network, which may include a satellite or a ground-to-air sub-network, to transmit and receive travel information, media content, or other data. For example, an aircraft may transmit and/or receive a communication signal via an antenna assembly mounted to the aircraft. Such satellite-based communication or connectivity is susceptible to signal interference associated with undesired signals from other sources, such as, satellites near or within a communication environment encompassing the source of the desired communication signal and/or at least a portion of the desired communication signal. This problem is particularly acute in antennas with very small aperture terminals (VSATs) where the transmitted beam-sizes are large and off-axis rejection is sometimes inadequate. It is therefore important to determine the occurrence and/or effect of signal interference within the communication environment and mitigate the associated adverse effects of the signal interference on the desired communication signal.

SUMMARY

This summary is provided to introduce a selection of concepts in a simplified form, with the concepts further described in the detailed description. This summary is not intended to identify key aspects or essential features or embodiments of the claimed subject matter, nor is it intended to be used to limit the scope of the claimed subject matter.

One embodiment is directed to method of reducing degradation of wireless communication with a mobile vehicle, wherein the method comprises: receiving, via an antenna assembly including a preferred orientation and coupled to the mobile vehicle, a wireless target-signal; attaining, via one or more processors coupled to antenna assembly, a first type of signal-quality characteristic of the received wireless target-signal, the first type of signal-quality characteristic being indicative of a signal quality; attaining, via the one or more processors, a second type of signal-quality characteristic of the received wireless target-signal, the second type of signal-quality characteristic being indicative of a signal quality, wherein the first and second types of signal-quality characteristics are different types of signal-quality characteristics and each having a different functional dependence on a combination of signal and noise associated with the received wireless target-signal; generating, via the one or more processors, an interference signature associated with the received wireless target-signal and the preferred orientation of the antenna assembly, the interference signature including a correlation of the attained first signal-quality characteristic and the second signal-quality characteristic; analyzing, via the one or more processors, the generated interference signature to determine a change or degradation in the correlation of the first and second signal-quality characteristics; and adjusting, via the one or more processors, the preferred orientation of the antenna assembly to another orientation based on the analysis of the interference signature, thereby reducing degradation of the wireless target-signal received at the mobile vehicle.

Another embodiment is directed to a method reducing degradation of wireless communication with a mobile vehicle, the method comprises: scanning, via an antenna assembly including a preferred orientation and coupled to the mobile vehicle, the antenna assembly through a plurality of orientations; receiving, via one or more processors coupled to the antenna assembly, a wireless target-signal at each of the plurality of orientations; attaining, via one or more processors, a first type of signal-quality characteristic of the received wireless target-signal at each of the scanned orientations, the first type of signal-quality characteristic being indicative of a signal quality; attaining, via the one or more processors, a second type of signal-quality characteristic of the received wireless target-signal at each of the scanned orientations, the second type of signal-quality characteristic being indicative of a signal quality, wherein the first and second types of signal-quality characteristics are different types of signal-quality characteristics and each having a different functional dependence on a combination of signal and noise associated with the received wireless target-signal; generating, via the one or more processors, an interference signature associated with the received wireless target-signal for each of the scanned orientations of the antenna assembly, each interference signature including a correlation of the attained first signal-quality characteristic and the second signal-quality characteristic; analyzing, via the one or more processors, the generated interference signature of each scanned orientation of the antenna assembly to determine a change or degradation in the correlation of the interference signature; and adjusting, via the one or more processors, the preferred orientation of the antenna assembly to another orientation based on the analysis of the interference signatures, thereby reducing degradation of the wireless target-signal received at the mobile vehicle.

A further embodiment is directed to a system of reducing degradation of wireless communication with a mobile vehicle, the system comprises: one or more processors coupled to the mobile vehicle; a memory coupled to the one or more processors; an antenna assembly coupled to the one or more processors and attached to the mobile vehicle, the antenna assembly including a preferred orientation, a receive (RX) aperture, and a transmit (TX) aperture; and a set of instructions stored on the memory, which when executed by the one or more processors; causes the system to: scan the antenna assembly through at least one of orientation of the antenna assembly; receive a wireless target-signal at each of the scanned orientations of the antenna assembly; attain a first type of signal-quality characteristic of the received wireless target-signal at each of the scanned orientations, the first type of signal-quality characteristic being indicative of a signal quality; attain a second type of signal-quality characteristic of the received wireless target-signal at each of the scanned orientations, the second type of signal-quality characteristic being indicative of a signal quality, wherein the first and second types of signal-quality characteristics are different types of signal-quality characteristics and each having a different functional dependence on a combination of signal and noise associated with the received wireless target-signal; generate an interference signature associated with the received wireless target-signal for at least one of the scanned orientations of the antenna assembly, each interference signature including a correlation of the attained first signal-quality characteristic and the second signal-quality characteristic; analyze the generated interference signature for at least one of the scanned orientation of the antenna assembly to determine a change or degradation in the correlation of the interference signature; and adjust the preferred orientation of the antenna assembly to another orientation based on the analysis of the interference signatures, thereby reducing degradation of the wireless target-signal received at the mobile vehicle.

DETAILED DESCRIPTION

Embodiments described herein relate to wireless communications including connectivity services to a mobile vehicle, wherein during normal operation of a communication system, the undesired effect of interference on a desired target-signal within a communication environment is identified and accounted for to improve the quality of the wireless communications to and/or from the mobile vehicle.

More specifically, a communication system and/or method includes receiving a wireless target-signal at an antenna assembly (e.g., very small aperture terminal (VSAT) antenna) operatively coupled to a communication controller (e.g., one or more processors, microprocessors) of a mobile vehicle. The desired target-signal is transmitted by a target-signal-source, e.g., satellite or ground communication center, and is received via the antenna assembly that is oriented, positioned, pointed, or aligned in a particular orientation with respect to the desired target-signal and/or the target-signal-source. The antenna assembly includes a transmit (TX) aperture and a receive (RX) aperture, wherein the communication controller and the antenna assembly are capable of cooperating to move or position the orientation of the apertures jointly or independently of each other, with respect to the desired target-signal and/or the source of the desired target-signal.

The communication signal received at the receive (RX) aperture of the antenna assembly is a composition of the desired target-signal emanating from the source of the desired target-signal and any undesired signal(s) (i.e., signal interference; e.g., noise), which may typically originate from one or more other signal sources (and may also include the source of the desired target-signal) within the communication environment. A signal-quality-metric is used to unambiguously determine and/or identify (e.g., measure, analyze, derive, calculate) an occurrence and/or effect (e.g., severity) of the undesired signal(s) adversely affecting the reception of the desired target-signal at the antenna assembly. The signal-quality-metric may include an interference-signature based on multiple signal-quality characteristics of the target-signal that is indicative of the communication quality. Types of signal-quality characteristics may include, and are not limited to, received-signal-strength (RSS) (e.g., received-signal-strength indicator (RSSI)), which is the sum of the signal and interference, e.g., noise present, and therefore may reflect a measure of the total power received at a channel of interest; signal-to-noise ratio (SNR), which is the ratio of the received desired signal to all other undesired power (e.g., interference, noise) in the channel; signal-plus-noise (S+N); signal-plus-noise-to-noise ratio (S+N)/N; a signal-to-interference-noise ratio (SNIR), and the like.

The interference signature reflects an association or correlation of two or more signal-quality characteristics of the desired target-signal received at the antenna assembly, which may depict a functional dependence on a combination of the desired target-signal and interference, e.g., noise, received at one or more orientations of the antenna assembly, e.g., receive (RX) aperture. The correlation of two or more signal-quality characteristics allows for discerning an unambiguous signal that can only be brought about because of interference. For example, using RSS and SNR for two of the at least two signal-quality characteristics of the interference signature, when no interference is present, there is a correlation that when one of these signal-quality characteristics increases, the other signal-quality characteristic increases. However, when interference is present, there is a detectable change in the correlation as compared to the correlation when no interference is present. That is, when interference is present, an increase in one of these signal-quality characteristics is accompanied by a decrease in the other signal-quality characteristics. A threshold level for determining or identifying signal interference may be based on: the correlation of at least two signal-quality characteristics (e.g., the interference signature) associated with a particular antenna orientation (e.g., receive (RX) aperture); a change or degradation in the correlation of the at least two signal-quality characteristics (e.g., the interference signature) associated with a particular antenna orientation (e.g., receive (RX) aperture); and/or a change or degradation in the correlation of at least two interference signatures associated with the same or different antenna orientation (e.g., receive (RX) aperture).

Identifying or detecting the presence of signal interference is vulnerable to vague and ambiguous determinations if less than two signal-quality characteristics are utilized. For example, when interference is not present and utilizing only received-signal-strength (RSS), positioning the antenna assembly towards the source (e.g., satellite station) of the desired target-signal will result in a signal with a high level of power, e.g., RSS; and positioning the antenna assembly away from the source of the desired target signal will result in a signal with a relatively lower level of power (RSS). However, when interference is present, for example, a nearby satellite station that is comparatively more powerful than the source of the desired target-signal, positioning the orientation of the antenna assembly away from the target-signal (e.g., towards the nearby communication satellite station) may likely result in a slightly "better" signal because of the relatively higher level of power (RSS) being received at the antenna assembly in comparison to when the antenna assembly was pointed more towards the target-signal and/or source thereof. It may therefore be difficult to determine which of these two satellite stations is better aligned, and in communication, with the antenna assembly.

Known techniques for ensuring and/or confirming the orientation of the antenna assembly implement dead-reckoning procedures to calculate and determine any deviation between where the target-satellite should be located and where the antenna assembly is orientated. Implementing such techniques may yield imprecise results due to the changing spatial relationship (e.g., angular measures) of the moving vehicle and/or the satellite(s). Another technique changes the orientation of the antenna assembly to search the signal environment for indications of signal interference. For example, if the received signals illustrate splayed signal data, as opposed to a concentration of signal data, e.g., point or dot; signal interference may be present. Simultaneously performing the calculations associated with these techniques during normal operation of the antenna assembly may negatively impact the quality communication service provided. Also, these known techniques must be performed with caution to avoid transmitting too far afield, e.g., into restricted space, while changing the orientation of the antenna assembly, which may violate regulatory licensing terms, etc. In contrast to these known techniques, embodiments described herein simultaneously receive the desired target-signal and process the at least two signal-quality characteristics thereof (e.g., interference signature) during the normal course of operation, which provides for an unambiguous signal that is indicative of interference, whereupon steps can be taken to mitigate the adverse effects of the interference.

One embodiment of the antenna assembly of the communication system includes two modes of operation—a first mode of operation where the orientation (e.g., position) of the transmit (TX) and receive (RX) apertures are jointly controlled by the controller, that is, the orientations of the transmit (TX) and receive (RX) apertures are substantially identical with respect to their alignment with the desired target-signal and/or the source of the desired target-signal; and a second mode of operation where the orientations of the transmit (TX) and receive (RX) apertures are separately and independently controlled, i.e., positioned, by the controller. When the antenna assembly is operating in the first mode, the positions of the transmit (TX) and receive (RX) apertures are coupled (e.g., jointly controlled or moved), wherein a change to one aperture's orientation results in a similar change to the other aperture's orientation. On the other hand, when the antenna assembly is operating in the second mode, the orientations of the transmit (TX) and receive (RX) apertures are separately and independently controlled and/or positioned by the controller, wherein the orientation of the transmit (TX) and receive (RX) apertures may be different with respect to each other, the desired target-signal, and/or the source of the desired target-signal. That is, during the second mode of operation of the antenna assembly, the position or orientation of the receive (RX) aperture of the antenna assembly is separately and independently controllable and its controlled movement or orientation does not affect the movement or orientation of the transmit (TX) aperture. Similarly, during the second mode of operation of the antenna assembly, the positioning or orientation of the transmit (TX) aperture of the antenna assembly is separately and independently controllable and its controlled movement does not affect the positioning or orientation of the receive (RX) aperture.

Each signal-quality characteristic of the desired target-signal may vary in unique ways, for example, in relation to the spatial relationship among the antenna assembly (e.g., transmit (TX) and/or receive (RX) apertures), the desired target-signal and/or source thereof, and/or a source(s) of signal interference. Because an interference source(s) may be localized in space and offset by a fixed angular distance(s) from the desired target-signal, a variation in the orientation of the antenna assembly (for example, the receive (RX) aperture) may correspondingly result in a unique variation in the interference signature and/or at least of the signal-quality characteristics of the interference signature, e.g., RSS, SNR, S+N, (S+N)/N, SNIR, etc., associated with each of the target-signals received at the various orientations of the antenna assembly.

Detecting and/or identifying the presence of signal interference may be determined based on measurements and/or analyses (e.g., calculation) of the signal-quality characteristics and/or the interference signature(s) associated with the desired target-signal received at one or more orientations of the receive (RX) aperture of the antenna assembly. For example, the presence and/or identification of signal interference may be determined based on: a comparison of the interference signature(s) (e.g., correlation of two or more signal-quality characteristics) at a particular orientation to a threshold level; a comparison of the interference signature(s) (e.g., correlation of two or more signal-quality characteristics) at a particular orientation over a period of time; a comparison of the interference signature(s) (e.g., correlation of two or more signal-quality characteristics) of different orientations of the antenna assembly (e.g., receive (RX) aperture); and/or any combination thereof, and the like.

Upon detection or identification of the presence of signal interference, one or more actions may be initiated by communication personnel, equipment, and/or a facility to reduce the adverse effect of the interference on the desired target-signal. One such action may include positioning the antenna assembly to effect a desired change in the correlation of the interference signature(s), for example, as a result of effecting a change to at least one of the signal-quality characteristics of the desired target-signal received at the vehicle. The desired change in the correlation of the interference signature(s) and/or one or more signal-quality characteristics thereof is indicative of a lessening in the signal interference affecting the desired target-signal received at the antenna assembly of the mobile vehicle. If the re-positioned orientation of the antenna assembly results in an improvement in the wireless communication, e.g., a reduction in the signal interference, the orientation of the re-positioned antenna assembly may be identified, recorded, and/or set as the desired orientation of the antenna assembly, which may then be maintained through further operation of the antenna assembly until signal interference is detected or identified, e.g., any of the signal quality characteristics and/or the interference signature(s) exceed the threshold level.

Another action to reduce the adverse effect of signal interference on the desired target-signal may include automatically executing the second mode of operation of the antenna assembly in response to detecting signal interference. For example, the antenna assembly may be operating in the first operating mode where the transmit (TX) and receive (RX) apertures are jointly positioned, aligned, oriented, etc., whereupon the detection of signal interference, the operation of the antenna assembly may be automatically changed to the second mode of operation where the position, alignment, or orientation of the receive (RX) aperture is adjusted independently of the transmit (TX) aperture to effect a desired change in the correlation of the interference signature(s), for example, as a result of effecting a change to at least one of the signal-quality characteristics of the desired target-signal received at the vehicle. The second operating mode of the antenna assembly allows for maintaining the orientation or alignment of the transmit (TX) aperture with the target satellite, while simultaneously allowing independent positioning of the receive (RX) aperture to effect the desired change in the correlation of the interference signature(s). The desired change in the correlation of the interference signature(s) and/or one or more signal-quality characteristics thereof is indicative of a lessening in the signal interference affecting the desired target-signal at the receive (RX) aperture of the antenna assembly of the mobile vehicle. If the re-positioned orientation of the receive (RX) aperture results in an improvement in the wireless communication, e.g., a reduction in the signal interference, the orientation of the re-positioned receive (RX) aperture may be identified, recorded, and/or set as the desired orientation of the receive (RX) aperture, which may be maintained through further operation of the antenna assembly until signal interference is detected or identified, e.g., any of the signal quality characteristics and/or the interference signature(s) exceed the threshold level.

Additionally, and/or alternatively, the antenna assembly may be operated in the second operation mode irrespective of the presence of signal interference, wherein independent movement of the receive (RX) aperture is executed to monitor the signal environment to seek an orientation of the receive (RX) aperture associated with improved communication, e.g., reception, of the desired target-signal. For example, during normal operation of the antenna assembly, the receive (RX) aperture may be re-positioned, e.g., scanned, from an initial preferred orientation to a prospective orientation that may potentially result in an improvement in the received target-signal at the prospective orientation in comparison to the initial, e.g., preferred, orientation of the receive (RX) aperture. Such an improvement may be denoted as a desired change in the result of the analysis of the correlation of the interference signature(s) (e.g., a change in one or more of the signal-quality characteristics of the target-signal received at the mobile vehicle) associated with the prospective orientation of the receive (RX) aperture. If the prospective orientation of the receive (RX) aperture results in an improvement in the wireless communication, e.g., a reduction in the signal interference, the orientation of the re-positioned receive (RX) aperture may be identified, recorded, and/or set as the preferred orientation and maintained through further operation of the antenna assembly until signal interference is detected, e.g., any of the signal quality characteristics and/or the interference signature(s) exceed the threshold. If the re-positioned orientation of the receive (RX) aperture does not result in an improvement in the wireless communication, the prospective orientation of the re-positioned receive (RX) aperture may be returned to its previous preferred orientation (prior to its repositioning) and maintained until scanning the receive (RX) aperture to another prospective orientation(s) and/or until signal interference is detected, e.g., any of the signal quality characteristics and/or the interference signature(s) exceed the threshold level.

The scanning of the independent-controlled receive (RX) aperture to seek an orientation exhibiting an improvement in the reception of the desired target-signal may include one or more prospective orientations, wherein the analysis/analyses of the correlation(s) of the interference signature(s) and/or one or more of the at least two signal-quality characteristics associated with the received target-signal may be executed at any point during or after the scan. That is, the preferred orientation of the receive (RX) aperture may be determined after any analysis of the correlation of the interference signature(s) and/or one or more of the associated signal-quality characteristics of the scanned prospective orientations of the receive (RX) aperture, wherein positioning of the receive (RX) aperture to the preferred orientation, if appropriate, may be executed thereafter. For example, the receive (RX) aperture may be repositioned to another prospective orientation to facilitate attaining signal quality characteristics and/or another interference signature(s) associated with the another prospective orientation of the receive (RX) aperture. To scan, the control system may move the receive (RX) aperture through several prospective orientations, e.g., a series, wherein correlations of signal-quality characteristics and/or the interference signature(s) may be measured and/or derived and associated with each prospective orientation in the series, and/or as an accumulation of any portion of the prospective orientations in the series. Further re-positioning of the receive (RX) aperture to the preferred or different orientation prior to subsequent scanning of the receive (RX) aperture may be based on the analysis of the signal quality characteristics and/or interference signature(s) of one or more of the scanned prospective orientations.

The scan of the signal environment by the receive (RX) aperture may include a pattern, such as a geometric shape, e.g., triangle, square, circle, arc, line, pentagon, hexagon, etc., with respect to the preferred orientation of the receive (RX) aperture, or the desired target-signal. The scan may be executed in a continuous, periodic, and/or intermittent manner and performed in any order or sequence. Subsequent adjustment of the receive (RX) aperture's orientation to the preferred orientation may be based on the acquired signal quality characteristics and/or interference signature(s)s attained, measured, derived, and or calculated for one or more of associated orientations of the scan.

Figure 1A:
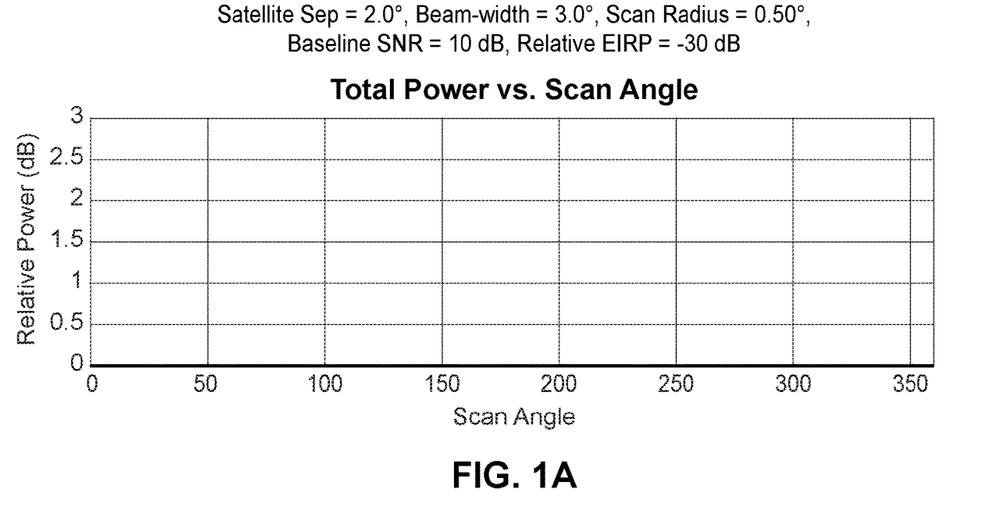
FIGS. 1A, 1B; 2A, 2B; 3A, 3B; and 4A, 4B include illustrated examples of paired graphs including signal-quality characteristic metrics attained, e.g., received, measured, and/or derived; from a desired target-signal in accordance with one or more of the embodiments described herein.
Figure 1B:
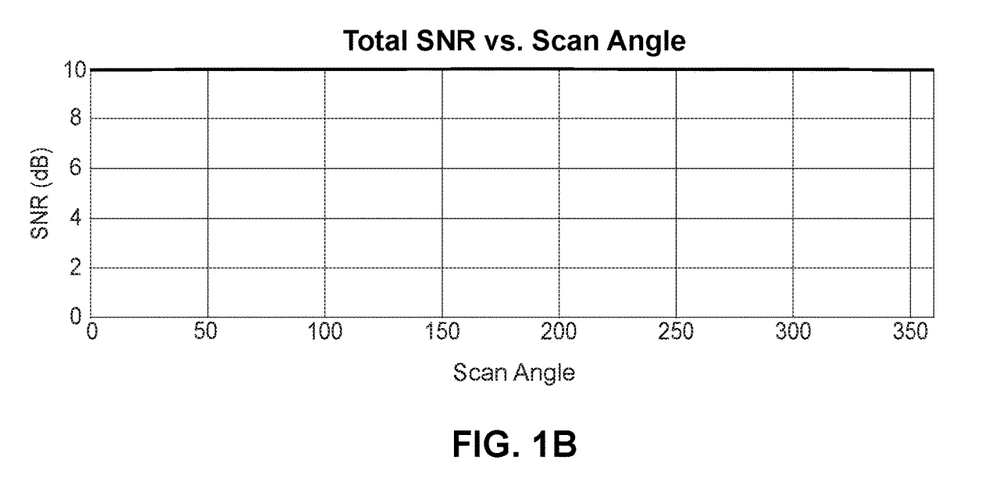
Figure 2A:
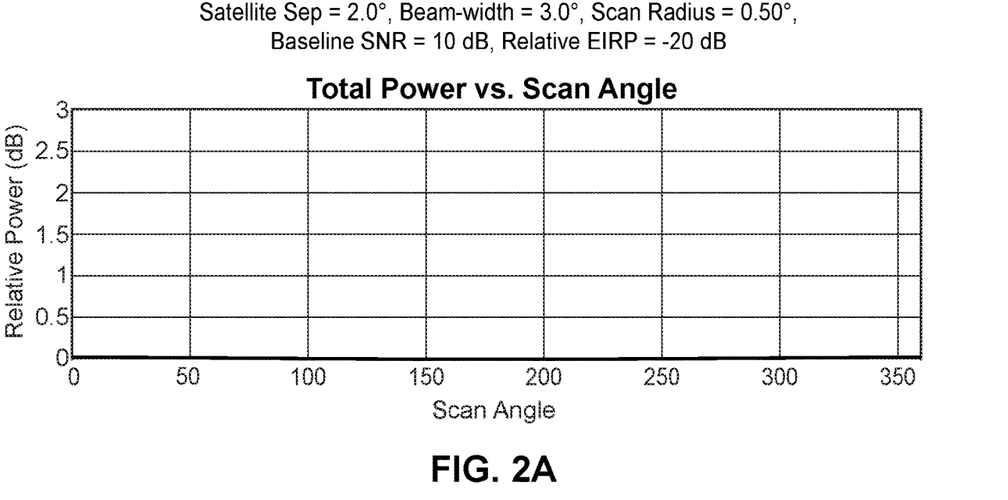
Figure 2B:
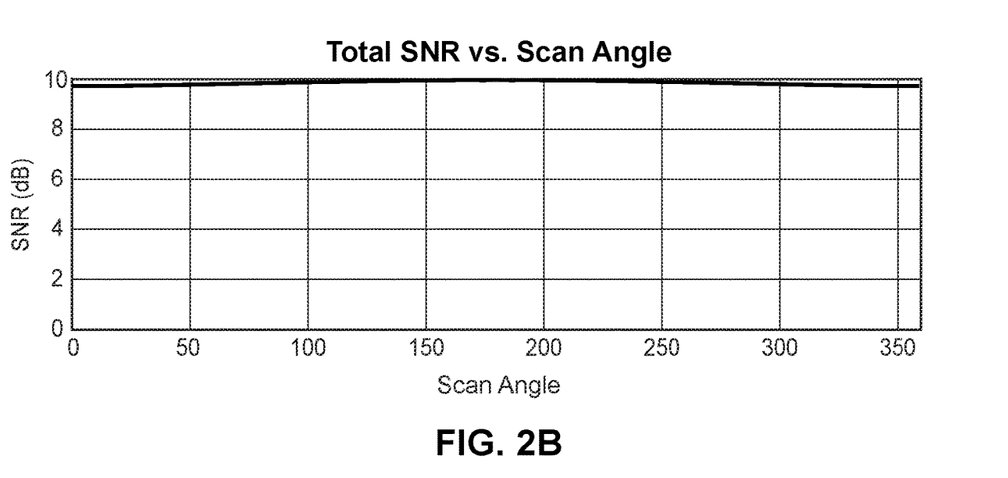
Figure 3A:
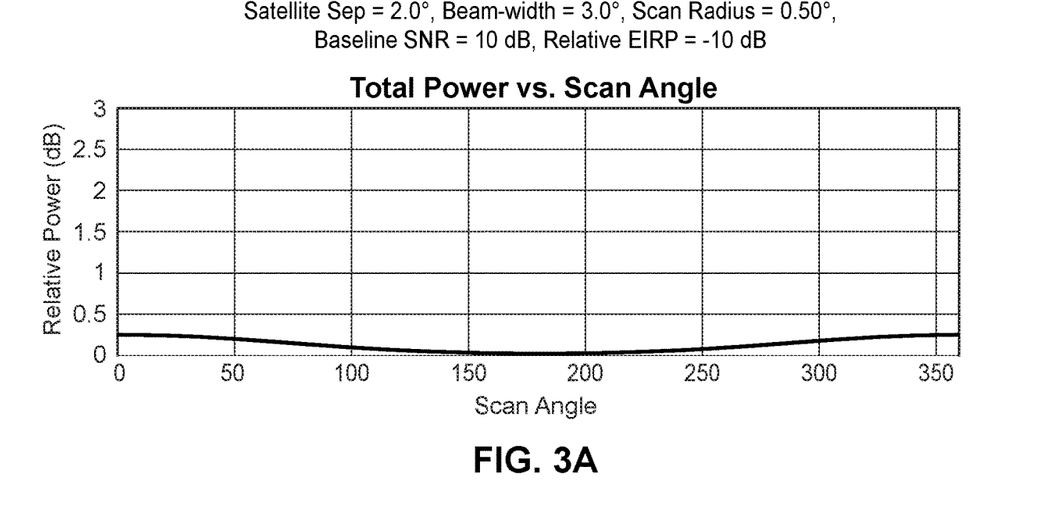
Figure 3B:
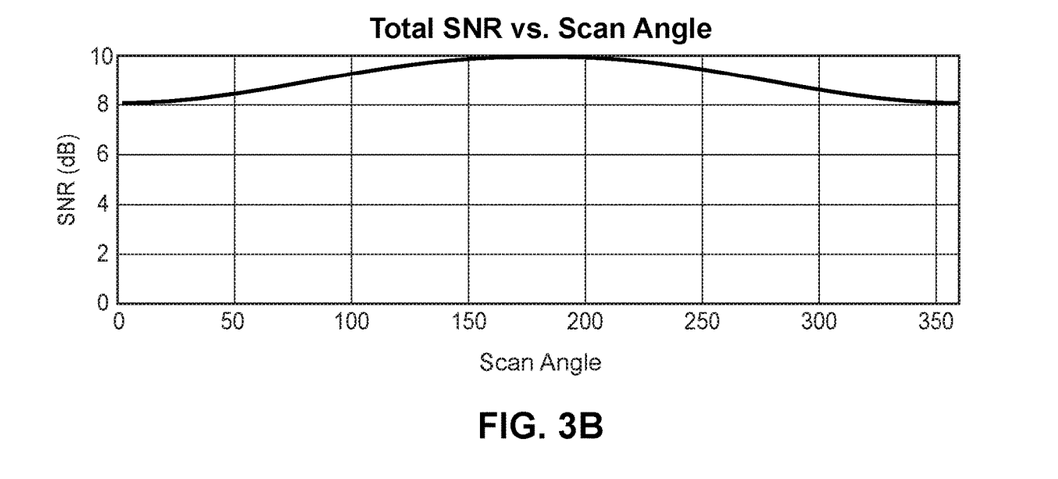
Figure 4A:
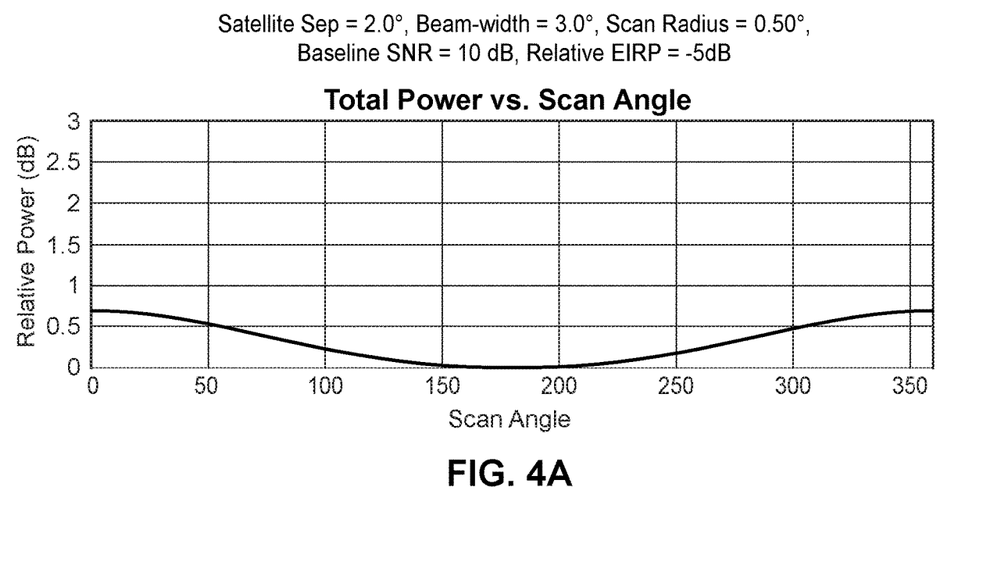
Figure 4B:
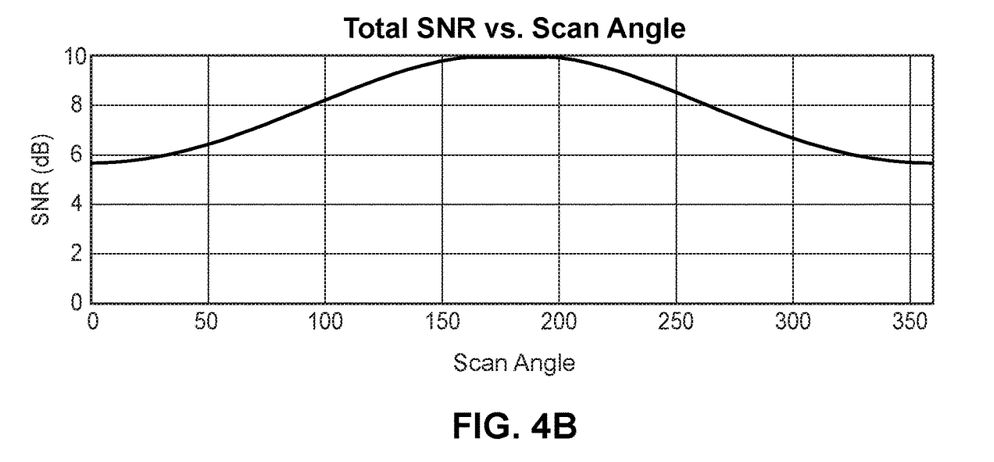

In one embodiment, the controller and receive (RX) aperture of the antenna assembly may perform a circular (e.g., 0°-360°) or conical scan of the signal environment (e.g., various orientations of the receive (RX) aperture) proximate the desired target-signal and/or source thereof. Various scan parameters may be utilized, including, and not limited to: satellite separation, beam-width, scan radius, baseline signal-quality characteristic (e.g., SNR), and relative signal-quality characteristic (e.g., equivalent isotropically radiated power (EIRP)). When little or no interference is present and the preferred (e.g., existing) orientation of the receive (RX) aperture, e.g., center of the scan, coincides with the target signal, there may be little or no variation in the two or more attained signal-quality characteristics, e.g., RSS, SNR, S+N, (S+N)/N, SNIR, etc. throughout the scan. For example, FIG. 1A (RSS or RSSI) and FIG. 1B (SNR) respectively depict a graph of the signal-quality characteristics received via the receive (RX) aperture while scanned in a circular pattern (e.g., scan angle of 0°-360°) proximate the target-signal and/or the source thereof. Because there is little or no signal interference present, there may be little or no effect on these signal quality characteristics. That is, FIGS. 1A and 1B respectively show the total power (RSS) level of 0 dB, and the SNR level of 10 dB remain essentially constant throughout the circular scan. However, as signal interference increases within the communication environment (see FIGS. 2A and 2B, 3A and 3B, and 4A and 4B), these signal-quality characteristics change during the scan, and their correlation, e.g., interference signature, may change in comparison to when little or no interference is present (e.g., FIGS. 1A and 1B). That is, as the presence of signal interference increases across FIGS. 2A and 2B, 3A and 3B, and 4A and 4B, the signal-quality characteristics, i.e., total power (RSS) and SNR, are affected, as well as their correlation, i.e., interference signature(s). For example, in FIG. 2A, the total power is essentially unchanged at 0 dB throughout the entire scan, and in FIG. 2B, the SNR remains constant at 10 dB between the scanned portion of 100°-250°, and tapers below 10 dB between the scanned portion of 250°-100°; in FIG. 3A, the total power remains unchanged at 0 dB between than scanned portion of 150°-200°, and slopes towards approximately 0.25 dB between than scanned portion of 200°-150°, and in FIG. 3B, the SNR remains essentially at 10 dB between the scanned portion of 150°-200°, and tapers towards approximately 8 dB between the scanned portion of 200°-150°; and in FIG. 4A, the total power remains essentially unchanged at 0 dB between than scanned portion of 150°-200°, and slopes towards approximately 0.70 dB between than scanned portion of 200°-150°, and in FIG. 4B, the SNR remains essentially at 10 dB between the scanned portion of approximately 160°-200°, and tapers towards approximately 5.75 dB between the scanned portion of 200°-160°.

The simultaneous measurement and consideration of two or more signal-quality characteristics (e.g., both RSS and SNR) provides additional information that allows for an antenna orientation with improved performance. For example, one or more of the generated interference signatures, which may be related to a 180° phase difference between two of the two or more attained signal-quality characteristics (e.g., RSS, SNR) may be used to trigger an alarm and/or to alert a monitoring facility in the event of deteriorating quality in the received target-signal and prompt a responsive action to adjust the orientation of the receive (RX) aperture of the antenna assembly appropriately. In one example embodiment, one or more generated interference signatures may be used to trigger or automatically initiate the second operating mode of the antenna assembly where the transmit (TX) and receive (RX) apertures are independently controlled and positioned with respect to each other. Typically, the orientation or positioning of the receive (RX) aperture is based solely on the orientation or positioning of the antenna assembly's transmit (TX) aperture. Decoupling the orientation or positioning of the receive (RX) aperture (with respect to the transmit (TX) aperture) based on the presence of signal interference to separate or modulate the positioning of the transmit (TX) and receive (RX) apertures may improve the antenna assembly's responsiveness to signal interference, and hence channel capacity, by allowing the receive (RX) aperture to migrate to a more favorable position or orientation based on one or more interference signatures, while maintaining the transmit (TX) aperture orientation with the target location based on the dead reckoning solution derived from inertial sensor data, compass data, differential GPS, or some other similar method for determining terminal location and orientation. Triggering alarms or special modes of operation based on the presence of signal interference will improve channel capacity by minimizing degradation to the cost basis, and improve robustness of service delivery and regulatory compliance by preventing or avoiding less favorable positioning (e.g., inadvertent transmission into restricted space) of the previously coupled transmit (TX) aperture when interference is present in the receive channel.

If only one signal-quality characteristic is utilized and considered (instead of attaining two signal-quality characteristics, e.g., RSS or RSSI, and SNR), the adjustment of the receive (RX) aperture of the antenna assembly may be orientated away from the desired signal in an effort to benefit the cost function of the positioning technique, e.g., of the sole signal-quality characteristic.

Figure 5:
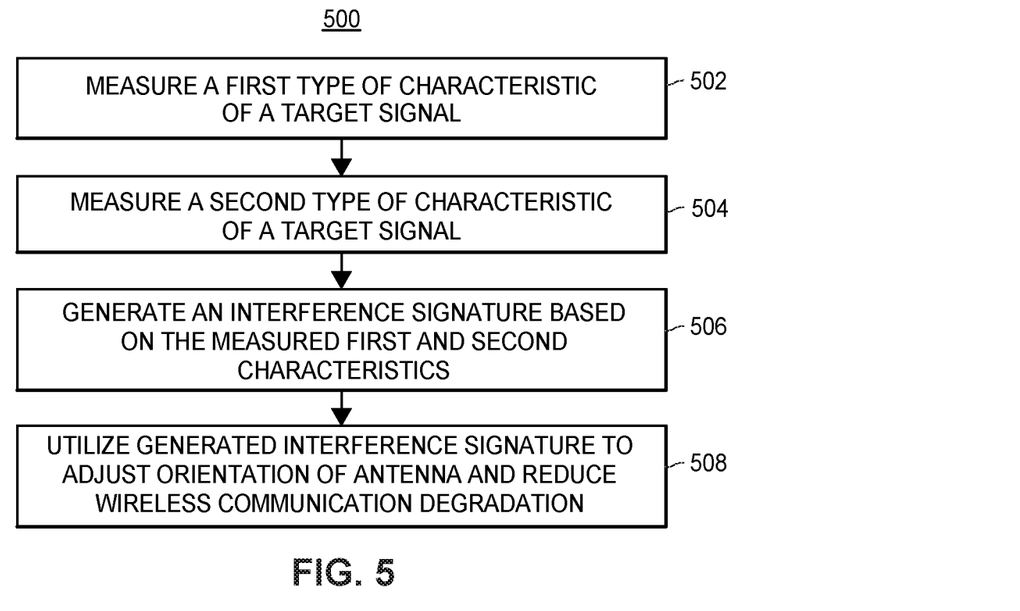
FIG. 5 illustrates a flow diagram of an example method for reducing degradation of a wireless communication in accordance with one or more of the embodiments described herein.

A flow diagram depicting an example method 500 according to one aspect of the present disclosure directed to reducing degradation of a wireless communication transmitted to and/or from a vehicle is illustrated in FIG. 5, wherein two or more signal-quality characteristics of a desired wireless target-signal are acquired (e.g., measure, derived) at blocks 502 and 504. The desired target-signal is a wireless communication within a signal environment transmitted from a single source, such as a satellite station, and received at a system that includes an antenna assembly attached to the vehicle. The system orientates the receive (RX) aperture of the antenna assembly about and/or towards the signal source and/or the target-signal, and monitors, measures, and/or calculates a signal-quality metric of the signal that is received via the one or more orientated positions of the receive (RX) aperture. Positioning of the receive (RX) aperture of the antenna across the plurality of orientations may be stepwise, incremental, continuous, periodic, automatic, etc. Each measured or derived signal-quality characteristic of the received target-signal of the one or more receive (RX) aperture positions is indicative of signal quality, and may be of one or more types and combinations thereof, including, but not limited to: RSS (RSSI), SNR, S+N, (S+N)/N SNIR, and the like. The types of the first and second signal-quality characteristics are different, and each may have a different functional dependence on the combination of signal and noise received for a particular orientation or position of the antenna assembly, for example, the receive (RX) aperture of the antenna, wherein the first characteristic is one signal-quality characteristic (e.g., RSSI), and the second characteristic is another, different, signal-quality characteristic (e.g., SNR).

At block 506, the system may generate or calculate one or more interference signatures for the desired target-signal. The interference signature(s) is based on a correlation of the at least two of the attained (e.g., measure, calculated, derived) signal-quality characteristics of the target-signal received at any of the orientations of the receive (RX) aperture. The interference signature may further be based on and/or associated with the orientation of the receive (RX) aperture when the target-signal was received at the antenna assembly, the time the target-signal was received, and/or any other information relating to signal data that is collected with respect to the signal source and/or the target-signal, etc. Based on a change or degradation of the interference signature(s) associated with target-signal, the system reduces the effects of signal interference affecting the wireless communication to the vehicle at block 508 by adjusting the orientation of the antenna assembly, i.e., receive (RX) aperture.

Alternatively, the signal environment or a portion thereof expected to encompass the target signal may be scanned or mapped by adjusting the position of the receive (RX) aperture of the vehicle antenna about (e.g., slightly askew or offset of the preferred orientation) the desired target signal and/or the communication source thereof (e.g., satellite). In particular, control of the positioning the receive (RX) aperture is decoupled from control of the positioning of the transmit (TX) aperture. That is, the position of the receive (RX) aperture is controlled independent of the positioning of the transmit (TX) aperture. While the positioning of the transmit (TX) aperture is maintained, and monitoring, measuring, and/or calculating signal quality metrics, e.g., RSS, SNR, S+N, (S+N)/N, SNIR, etc.; of the signal that is received via the antenna at one or more of the adjusted antenna positions. Any adjustment to the position or orientation of the antenna may include small deviations, for example, stepwise (e.g., discrete), incremental, continuous, repetitive, periodic, and the like. Uncoupled control of the transmit (TX) aperture may be accomplished by the one or more processors executing dead-reckoning techniques and/or other navigational calculations to maintain the direction of the transmit (TX) aperture toward the target source and ensure operative transmission to the desired destination during movement of the mobile vehicle.

Figure 6:
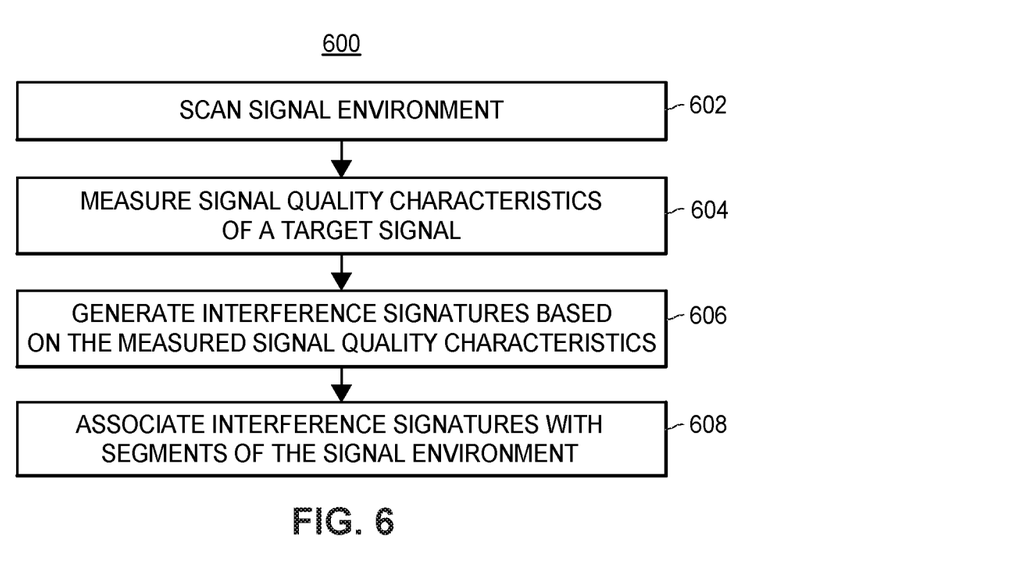
FIG. 6 illustrates a flow diagram of another example method for reducing degradation of a wireless communication in accordance with one or more of the embodiments described herein.

FIG. 6 depicts a flow diagram illustrating an example method 600 according to another aspect of the present disclosure directed to reducing degradation of a wireless communication transmitted to and/or from the mobile vehicle, wherein at block 602, the signal environment that contains, wholly or partially, the desired target-signal is scanned or mapped to detect and locate interference within the signal environment. The mapped or patterned signal environment may include and/or be associated with a plurality of interference signatures, wherein one or more interference signatures may be associated with at least one of a plurality of orientations among which at least a portion of the antenna assembly, e.g., the receive (RX) aperture, may be positioned with respect to the signal source and/or the desired target-signal. For example, the system may scan the signal environment by varying the position or orientation of the receive (RX) aperture towards the desired target-signal, the source thereof, and/or the preferred orientation therewith. At block 604, the controller measures and/or derives multiple signal-quality characteristics of the desired target-signal for a variety of positions or orientations of the receive (RX) aperture of the antenna assembly. The positioning of the receive (RX) aperture may be in discrete or continuous movements. Upon attaining the measured and/or derived signal-quality characteristics, the system may generate, at block 606, the interference signature(s) based on the measurements of two or more signal-quality characteristic types. The generated interference signature(s) may also include various combinations and weightings, e.g., proportions, of the measured signal-quality characteristic types. One or more of the measured signal-quality characteristics and/or the generated interference signatures may each be associated with a particular orientation of one or both of the transmit (TX) and receive (RX) apertures of the antenna, segment or location of the signal environment, the signal source, the target-signal, etc. All data and information relating to or derived from the measured signal-quality characteristics, interference signatures, signal environment, signal source, antenna position(s), etc. may be stored in a memory device and accessible to the mobile vehicle (and/or other mobile vehicles) for use in positioning the receive (RX) aperture of the antenna assembly to reduce and/or avoid the degrading effects of interference on wireless communication during subsequent travel of the vehicle.

In some configurations, interference signatures may be constructed based on the scanned interference data about the desired the target signal. The scanned interference data and associated interference signature(s) may be used to facilitate detecting and/or identifying signal interference and/or mitigating the effects of signal interference encountered or expected to be encountered during communication with the mobile vehicle. Additional information may be gathered to aid in measuring and reducing the adverse effects of the interference on the target-signal. In particular, the orientation of the receive (RX) aperture of the antenna assembly with respect to the desired target-signal may be adjusted based on the scanned interference data of the signal environment or a portion thereof to reduce degradation of signal service by interference within the signal environment. For example, the receive (RX) aperture may be positioned to avoid and/or reduce the effects of the interference upon the received target-signal.

Figure 7:
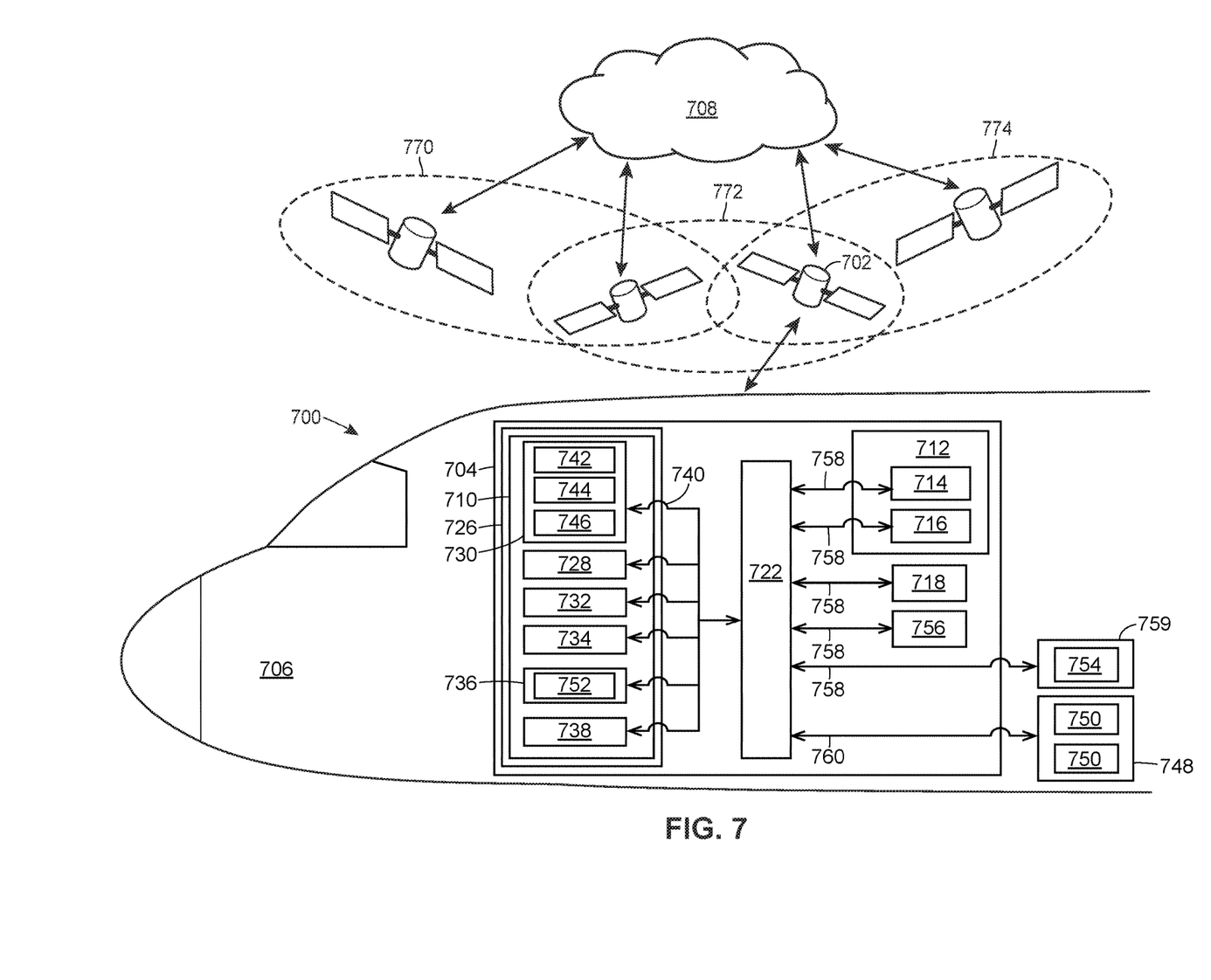
FIG. 7 is a block diagram illustrating an example system for reducing degradation of a wireless communication in accordance with one or more of the embodiments described herein.

FIG. 7 depicts an example communication system 700 incorporating one or more aspects described above for facilitating wireless communication. A satellite station 702 may be part of or associated with a communication network(s) 708 or constellations of communication satellite stations moving about the earth at various altitudes and speeds. Each communication satellite station may include a deterministic path or orbit, for example, high earth orbit (HEO), geostationary earth orbit (GEO), medium earth orbit (MEO), and low earth orbit (LEO). The satellite station 702 is capable of relaying information between a mobile communicator 704 mounted to a mobile vehicle 706 and the communication network 708, e.g., satellite station 702, ground station (not shown), and the like.

Communication among any of the components of the communication network 708 may or may not include a proprietary network, a satellite sub-network, a secure public internet, a virtual private network, a ground network/sub-network, a ground-based wireless network, or some other type of network, such as dedicated access lines, plain ordinary telephone lines, satellite links, and combinations of these, etc. Where the communication network includes the internet, data communications may take place over the network 708 via an internet communication protocol.

The example communication system 700 is configured to reduce degradation of a wireless communication transmitted to and/or from the vehicle 706 by adjusting the orientation of an antenna 712 (e.g., an active electronically scanned array (AESA) antenna) mounted on the vehicle 706 to detect, reduce, and/or avoid signal interference within one or more signal environments, 770, 772, 774, that may adversely affect reception of a target signal. While the mobile vehicle 706 is depicted and described herein as an aircraft, it should be understood that the communication system 700 and phased array antenna 712 mounted on the aircraft 706 may instead be incorporated on another type of vehicle (e.g., a car, truck, train, and/or boat, any of which may be in motion), and the transmissions described herein may be between the other type of vehicle and yet another network component (e.g., a satellite, and/or yet another vehicle). Additionally or alternatively, the phased array antenna 712 may be mounted on a stationary entity (not shown, e.g., ground station), and the communication transmissions described herein may be via a link between the stationary entity and yet another entity (e.g., a mobile vehicle such as the aircraft 706, one or more satellites, and/or another ground station). In other words, while FIG. 7 illustrates one embodiment, various other configurations and arrangements may be possible, as will be evident from this detailed description.

The phased array antenna 712 may include a transmitter or transmit (TX) aperture 714 and a receiver or receive (RX) aperture 716. Wireless transmission of a communication signal that includes information and/or data may be sent from the aircraft 706 via the transmit (TX) aperture 714, and wireless transmission that includes information and/or data may be received at the aircraft 706 via the receive (RX) aperture 716 of the phased array antenna 712. Control of the pointing or positioning of the transmit (TX) aperture 714 and/or receive (RX) aperture 716 may be dependent or independent of each other. That is, control of the transmit (TX) aperture 714 may or may not be related to the control, position, and/or orientation of the receive (RX) aperture 716, and vice versa.

In some embodiments, the communication link between the aircraft 706 and the ground station (not shown) may be achieved in part via one or more satellites or one or more other intermediaries. For example, a transmission from a ground station to the aircraft 706 may include transmission from the ground station to the satellite 702, and the contents of which may be subsequently transmitted from the satellite 702 to the aircraft 706. Thus, in this example, the pointing of the receive (RX) aperture 716 may be a pointing at least generally in the direction of the source of the target signal, e.g., satellite 702. Accordingly, it should be understood that, as described herein, a transmission between any first entity (or "origin") and any second entity (or "end target") may, in some embodiments, involve additional intermediaries, such as the one or more of the satellites, which may be situated or disposed communicatively between the terminal entities. Further, it should be understood that, in these embodiments, an orientation of either aperture 714, 716 of the phased array antenna 712 may refer to a positioning at least generally in the direction of the target satellite 702 or other intermediary, with the received target signal reaching the end target via the intermediary.

Although one satellite station 702 is specifically designated in FIG. 7, it is to be understood that additional satellite stations may be utilized by the mobile communicator 704 to facilitate communication with the communication network 708. In particular, the mobile communicator 704 may maintain communication with the network 708 over an extended period of time through a series of individual communication links with separate target satellite stations and/or separate overlapping signal environments 770, 772, 774. For example, the mobile communicator 704 is adapted and configured to initiate, coordinate, execute, instruct, and/or participate in communication with the satellite station 702 including one or more orientations of the TX aperture 714 and/or the RX aperture 716 of the antenna assembly 712. Additionally, the mobile communicator 704 may facilitate and support bi-directional communication between the mobile vehicle 706 and the transmitting satellite 702, which may ultimately include a ground communication network(s), and end-user mobile communication devices (e.g., mobile phone, personal computer (laptop/tablet), wearable computing and/or communicating devices) operatively coupled to a local area network (LAN) and/or a wireless LAN (WLAN) 748 or other type of network configured aboard the aircraft 706.

The components of the mobile communicator 704 may include one or more controllers, antennas, analyzers, sensors, positioning modules, and memory components for facilitating communication with the satellite station 702. A controller 710 may be housed within a line-replaceable unit (LRU) 726 and affixed to the mobile vehicle 706. The antenna 712 assembly, an analyzer 756 and/or sensor, a positioning module 718 (e.g., global positioning unit (GPS)), and an external memory device 754 are coupled to the controller 710 via an input/output (I/O) circuit 722 and a respective conduit 758. Although the I/O circuit 722 is shown in FIG. 7 as a single block, it may include a variety of types of I/O circuits. The antenna 712 assembly, analyzer 756 and/or sensor, and/or portions thereof, may be housed within a radome extending from the mobile vehicle 708, wherein the antenna 724 may be positioned by the controller 710 for interaction with the satellite stations and scanning the respective signal environments associated therewith.

The controller 710 may include one or more computing devices or processors 728 (e.g., microcontroller, microprocessor), a program memory 730, one or more communication modems 732, 734, a random-access memory (RAM) 736, and a communication router module 738; all of which may be interconnected via an address/data bus 740. The controller 710 may include multiple program memories and RAMs, and that these program memories and RAMs may be implemented as semiconductor memories, magnetically readable memories, and/or optically readable memories, for example. The modems 732, 734 may be configured to modulate carrier wave signals to be transmitted via the transmit (TX) aperture 714 of the phased array antenna 712. Transmissions and/or receptions of carrier wave signals may be accomplished via the phased array antenna 712 attached, e.g., fixedly or removable mounted, on the top, bottom, or some other portion of the aircraft 706, and/or some combination of the type, portion, amount, and location of antenna assembly attached to the aircraft 706. It should be understood that the wireless communications described herein may include transmissions of frequencies in the L, S, C, X, Ku, K, Ka, 2.4 GHz, 5 GHz, 800 MHz, and/or any other suitable bands. In some embodiments, the vehicle may include multiple transceivers of different types and include the capability of wireless communication with ground systems. One or more transceivers and their respective transmit (TX) and receive (RX) apertures may be located within one or more radomes positioned about the vehicle, e.g., front, rear, top, and/or bottom of the aircraft.

The program memory 730 and/or the RAM 736 may include a plurality of software applications 742, 752 a plurality of software routines 744, and a graphical user interface (GUI) module 746. The software applications 742 and/or routines 744 may include instructions and steps that when executed by the processor 728, such as a controller processor unit (ACPU) for an air-to-ground communication system, for example, cause the mobile vehicle 706 to facilitate and support bi-directional end-user device 750 call/data/communication pathways from terminal and/or intermediary communication components of the communication network 708 to/from the end-user mobile devices 750. That is, the processor 728 is communicably coupled via a conduit 760 to the LAN/WLAN 748 and configured to enable the mobile communication device 750 of an end user, e.g., passenger aboard the mobile vehicle 706, to communicate with the network 708 via the communication link 702. In particular, the processor 728 and communication router module 738 may cooperate to coordinate call traffic routing and subscriber management, including a conversion between digital modem traffic from the antenna 712 and Wi-Fi traffic from the end-user mobile device(s) 750 operatively coupled to the LAN/WLAN 748. End-user specific information that may be used by the processor 728 and/or communication router module 738 while coordinating call traffic, etc., may include account information, billing information, and media content, any of which may be stored in one or more of the memory devices able to be accessed by the processor 728.

The software applications 742 and/or routines 744 also include instructions and steps that when executed by the processor 728 cause the mobile communicator 704 to determine interference signatures based on locations of interference within the signal environment as depicted in the methods described herein. For example, the software applications 742 or routines 744 may include a communicator controller application or routine having a set of instructions that when executed by the processor 728 cause the controller 710 to carry out various applications and functions associated with detecting and/or measuring signal quality characteristics associated with the signal source and/or the desired signal within the signal environment, generating the interference signature(s) based on preferably at least two of the measured signal quality characteristics, and utilizing the generated interference signature(s) to position the antenna, e.g., receive (RX) aperture 716, to reduce the degrading effects of the interference on the received desired communication signal. Further, execution of the communicator controller application by the processor 728 may initiate, coordinate, execute, or instruct one or more steps for reducing interference degrading wireless communication with the vehicle by moving the receive (RX) aperture 716 with respect to the signal source satellite of the transmitted desired signal and detecting, and/or measuring signal quality characteristics, e.g., RSS (RSSI), SNR, S+N, (S+N)/N, SNIR, etc., about the signal source and/or the target signal, and generating and/or storing interference signatures based on the signal quality characteristics for later use to reduce the degrading effects of the interference on the desired signal by offsetting the position of the receive (RX) aperture 716 with respect to the signal source and/or target signal and improve wireless communication between the signal source and the vehicle 706.

As the vehicle 706 travels, it is expected that the effects of the signal interference within the signal environment may change due to the spatial relationship between the vehicle 706, signal source, and the type and location of the source(s) of interference. The controller 710 attains the signal quality characteristics (e.g., RSS (RSSI), SNR, S+N, (S+N)/N, SNIR, etc.) associated with various positions of the RX aperture 716 and may store the interference data on the memory device, e.g., RAM 736, of the mobile communicator 704. The interference data, e.g., measured and/or detected signal quality characteristics, may also be stored on the external memory device 754 operatively coupled to the controller 710 and/or transmitted to the controller 710 in response to a request sent from the controller 710. Additionally, the interference data may be stored in any location, e.g., ground network, and accessible to any vehicle for use in positioning its antenna to reduce and/or avoid the degrading effects of interference on wireless communication during subsequent travel of the vehicle.

Because the route traveled by vehicle 706 is known or is capable of being readily determined via dead reckoning, e.g., location, velocity, direction; and the locations or travel paths of the signal source, e.g., satellite station 702 is known or can be attained through the one or more satellite network maps, the controller 710 may determine, calculate, forecast, and/or predict the location of interference within the signal environment with respect to the position of the vehicle 706 when communication signals are received at the receive (RX) aperture 716. The determination of the interference within the signal environment may be based in part on one or more considerations or combinations thereof, such as: the type of satellite station, the location of the satellite station, the distance of the satellite station from the vehicle 706, and the amount and particularity of time the signal source and/or interference source(s) is expected to be within communication range of the vehicle 706, for example. The mobile communicator 704 may use travelling characteristics of the vehicle 706 and the prospective signal sources of the satellite network maps to calculate or determine locations of interference within the prospective signal environment.

Upon identifying, attaining, measuring, calculating, and/or receiving one or more interferences within the signal environment, the controller 710 may construct interference signatures related thereto for use in reducing and/or avoiding the effect of the interference on the communication signal received from the signal source. For example, the processor 728 and/or analyzer 718 of the controller 710 may generates one or more interference signatures based on the detected and/or measured signal quality characteristics associated with a signal source and determine different orientations of the receive (RX) aperture 716 wherein the received target signal is less affected by the signal interference within the signal environment. As the signal interference expected to be encountered within the signal environment changes during travel of the vehicle, the position of the receive (RX) aperture 716 with respect to the transmitting satellite may be adjusted and/or offset to reduce the effects of interference degrading the communication signal. In short, the processor controller 710 may initiate, coordinate, execute, or instruct the timely positioning of the receive (RX) aperture 716 based on one or more interference signatures derived from the detected and/or measured signal quality characteristics associated with the signal source for adjustment of the orientation of the receiving antenna 712 to limit and/or avoid the detrimental effects of signal interference within the signal environment.

The signal quality characteristic(s) and/or interference signature(s) may be a reliable indicator of accurate or inaccurate orientation of the receive (RX) aperture 716 of the phased array antenna 712. For example, an offset of the orientation of the receive (RX) aperture 716 may induce an increase and/or decrease in the signal and/or noise level to due to the effect on two or more signal quality characteristics of the target signal received via the RX aperture 716. Consequently, when the offset of the receive (RX) aperture 716 is adjusted, a reduction in the interference of the desired signal may be observed. Such adjustments or changes in the orientation of the receive (RX) aperture 716 may be monitored at the modems 732, 734, via a controller 710 communicatively connected to the modems 732, 734. The interference signature(s) may be associated with operation of the modems 732, 734, and the controller 710 may include one or more processors 728 and one or more computer memories storing computer-executable instructions thereon, that when executed via the one or more processors 728, cause the controller 710 and/or modems 732, 734 to perform actions of the system 700 related to reducing interference in wireless communication with the mobile vehicle as described herein.

At some point after adjusting the receive (RX) aperture 716 to improve wireless communication, the controller 710 may determine that the interference affecting the desired target signal has exceeded a predetermined threshold, and/or an adjustment of the orientation of the RX aperture is warranted. For example, an alarm or an alert to communication personnel, equipment, and/or a facility capable of monitoring and reducing the adverse effects of the interference on the desired target signal may be triggered by the exceeded threshold. In response thereto, the controller 710 may utilize the interference signatures to reposition the receive (RX) aperture 716 accordingly as described herein.

In other possible embodiments, at least one of the above-described means of positioning the receive (RX) aperture 716 may be utilized in positioning the transmit (TX) aperture 714. For example, the controller 710 may adjust the pointing of the transmit (TX) aperture 714 based on the monitored/measured interference effects of a signal transmitted from the vehicle 706. In still other possible embodiments, the controller 710 may implement within a control loop any of the means described herein for adjustment of the orientation of the transmit (TX) and receive (RX) aperture 714, 716. For example, a first control loop may include monitoring the position of the receive (RX) aperture 716 with respect to interference within the signal environment and adjusting the pointing of the receive (RX) aperture 716 accordingly, based on the generated interference signatures. A second control loop may include monitoring communication with respect to signals transmitted from the vehicle, and adjusting the pointing of the transmit (TX) aperture 714 with respect to a communication device, e.g., satellite, accordingly. Using the above described techniques, either aperture 714, 716 may be pointed independently of the other aperture. The independent pointing may be a mutually independent pointing of the TX aperture 714 and the receive (RX) aperture 716 (i.e., transmit (TX) aperture 714 orientation does not affect receive (RX) aperture 716 orientation, and receive (RX) aperture 716 orientation does not affect transmit (TX) aperture 714 orientation). As a result of independent (e.g., mutually independent) positioning of the TX aperture 714 with respect to the positioning of the receive (RX) aperture 716, any problems, errors, or inaccuracies in positioning of the receive (RX) aperture 716 may avoid transfer to the positioning of the transmit (TX) aperture 714, and vice versa.

From the description above, it is readily apparent that the present disclosure incorporates methods and systems by which the orientation of a receive (RX) aperture of a phased array antenna may be controlled to reduce and/or avoid the degrading effect of signal interference on a wireless signal communication within a signal environment. For example, the system generates the one or more metrics via a controller (e.g., one or more processors, microprocessors) that relate to the signal quality of the received target-signal as a function of the one or more instantaneous orientations of the receive (RX) aperture of the antenna assembly. Multiple types of signal-quality characteristics (e.g., RSS, SNR, S+N, (S+N)/N, SNIR, etc.) associated with the desired target-signal may be monitored, acquired, measured, and/or derived and used to generate an interference signature based on two or more of the signal quality characteristics, wherein the system may then utilize one or more of the interference signatures to accordingly position the antenna and improve the wireless communication. Scanning or mapping the signal environment by varying the orientation of the receive (RX) aperture of the antenna assembly allows for the gathering and/or determining of the signal-quality metrics for one or more orientations of the antenna assembly, wherein the system may generate one or more associated interference signatures based on a correlation of two or more signal-quality characteristics. In this way, an interference source(s) and/or the effects thereof within the signal environment may be localized in space, for example, offset by a fixed angular distance from the received target signal. As such, unique variations in the signal quality metrics may correspond to specific, unique variations in the orientation of the receive (RX) aperture of the antenna assembly with respect to the target-signal. Detected changes and/or degradations in the correlation or the interference signature(s) (e.g., two or more signal-quality characteristics) enable identification of signal interference as well as initiate efforts to mitigate the degrading effects of the interference on the received target-signal. For example, using the interference signatures, the receive (RX) aperture may be pointed or positioned (independently of the transmit (TX) aperture) to reduce and/or avoid the degrading effects of interference on the target signal.

Unless specifically indicated otherwise, the words "a" and "an" in reference to components of the system are used simply for ease of description, and are not intended to be limiting. In other words, where a component or an entity is described, one or more components and/or one or more entities may be possible. For example, it is understood that, in some embodiments, the vehicle may be outfitted with one or more phased array antennas. Further, during travel, the vehicle may establish or maintain one or more communications links with one or more signal sources (e.g., a handoff process between satellites) and/or one or more ground stations via one or more respective phased transmit antenna arrays. Furthermore, transmission of any single communication may involve additional components (e.g., additional relay stations and/or satellites) not illustrated. Of course, any number of any of the techniques, principles, features, and/or concepts discussed herein apply equally to an attached phased array antenna utilized for satellite or other air-to-air communications, or to a phased array antenna that is utilized for direct air-to-ground communications.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

While pointing of a receiver aperture of a phased array antenna is described herein, it should be appreciated that the concepts described herein may be applied to other types of antennas, unless indicated otherwise. For example, in some embodiments, the phased array antenna may instead be a single antenna without a phased array. Further, while the phased array antenna described herein is generally described as being mounted on an aircraft, it should be appreciated that the phased array antenna may additionally or alternatively be mounted on another type of vehicle (e.g., a car, truck, train, or boat), or mounted on some other system (e.g., a ground station).

Unless specifically stated otherwise, discussions herein using words such as "pointing," "aiming," "directing," in reference to a transmit (TX) and/or a receive (RX) aperture of a phased array antenna or another antenna may refer to the directing of the antenna aperture (or "opening"). Hence, a "pointing," "aiming," or "directing," of the transmit antenna aperture may refer to a direction that signals are to be transmitted via the transmit antenna aperture or opening. A "pointing," "aiming," or "directing," of the receive antenna aperture may refer to a direction via which the receive antenna aperture or opening is exposed to receive signals from, for example, a satellite and/or a ground station. Further, a pointing, aiming, or directing of an antenna aperture may refer to a pointing of the antenna aperture at least generally toward another entity (e.g., a transmit antenna aperture may "lead" a target of a transmitted signal, given a known or estimated signal travel time).

While the transmit and receive antenna apertures herein are generally described as being communicatively connected to a same modem, it should be understood that, in some embodiments, the transmit antenna aperture and the receive antenna aperture may be communicatively connected to separate modems. Further, in some embodiments, one or more modems may be fixedly and/or communicatively connected to an entity (e.g., a vehicle such as an aircraft in transit or another vehicle in transit, a ground station, etc.), and/or the entity may include more than one transmit aperture and/or receive aperture. For example, a vehicle such as an aircraft may include a first transmit aperture to transmit modulated carrier wave signals to a satellite, and a second transmit aperture to transmit modulated carrier wave signals to a ground station. As another example, a vehicle such as an aircraft may include a first receive aperture to receive signals via a satellite, and a second transmit aperture to receive signals via a ground station.

In some embodiments, a ground station may include or be communicatively connected to a teleport antenna and/or a modem platform hub. Further, in some embodiments, an entity (e.g., an airplane) to which an antenna (e.g., an AESA antenna) is mounted and/or communicatively connected may include and/or be communicatively connected (directly or indirectly) to a KRFU, a KANDU, and/or a MODMAN.

It should be understood that, unless a term is expressly defined in this patent using the sentence, "As used herein, the term '_____' is hereby defined to mean . . . ," or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Also, unless a claim element is defined by reciting the word "means" and a function without the recital of any structure, it is not intended that the scope of any claim element be interpreted based on the application of 35 U.S.C. § 112(f).

Although the above detailed description sets forth numerous embodiments, it should be understood that the legal scope of the invention is defined by the words of the claims at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims. By way of example, and not limitation, the disclosure herein contemplates at least the following aspects:

Aspect 1: A method of reducing degradation of wireless communication with a mobile vehicle, the method comprising: receiving, via an antenna assembly including a preferred orientation and coupled to the mobile vehicle, a wireless target-signal; attaining, via one or more processors coupled to antenna assembly, a first type of signal-quality characteristic of the received wireless target-signal, the first type of signal-quality characteristic being indicative of a signal quality; attaining, via the one or more processors, a second type of signal-quality characteristic of the received wireless target-signal, the second type of signal-quality characteristic being indicative of a signal quality, wherein the first and second types of signal-quality characteristics are different types of signal-quality characteristics and each having a different functional dependence on a combination of signal and noise associated with the received wireless target-signal;

generating, via the one or more processors, an interference signature associated with the received wireless target-signal and the preferred orientation of the antenna assembly, the interference signature including a correlation of the attained first signal-quality characteristic and the second signal-quality characteristic; analyzing, via the one or more processors, the generated interference signature to determine a change or degradation in the correlation of the first and second signal-quality characteristics; and adjusting, via the one or more processors, the preferred orientation of the antenna assembly to another orientation based on the analysis of the interference signature, thereby reducing degradation of the wireless target-signal received at the mobile vehicle.

Aspect 2: The method of aspect 1, wherein the antenna assembly includes a receive (RX) aperture and a transmit (TX) aperture, the method further comprising: initiating, via the one or more processors, a mode of operation of the antenna assembly based on the analysis of the interference signature, wherein the orientation of the receive (RX) aperture is controlled independently of the transmit (TX) aperture; and the adjusting the preferred orientation of the antenna assembly includes independently adjusting the receive (RX) aperture to another orientation without affecting the transmit (TX) aperture.

Aspect 3. The method of any one of aspects 1-2, wherein the first signal-quality characteristic type is a signal-to-noise ratio (SNR), and the second signal-quality characteristic type is a received signal strength (RSS).

Aspect 4. The method of any one of aspects 1-3, wherein the first and second signal-quality characteristic types are one of a signal-to-noise ratio (SNR), a received signal strength (RSS), a signal-plus-noise-to-noise ratio ((S+N)/N), or a signal-to-interference-noise ratio (SNIR).

Aspect 5. A method of reducing degradation of wireless communication with a mobile vehicle, the method comprising: scanning, via an antenna assembly including a preferred orientation and coupled to the mobile vehicle, the antenna assembly through a plurality of orientations; receiving, via one or more processors coupled to the antenna assembly, a wireless target-signal at each of the plurality of orientations; attaining, via one or more processors, a first type of signal-quality characteristic of the received wireless target-signal at each of the scanned orientations, the first type of signal-quality characteristic being indicative of a signal quality; attaining, via the one or more processors, a second type of signal-quality characteristic of the received wireless target-signal at each of the scanned orientations, the second type of signal-quality characteristic being indicative of a signal quality, wherein the first and second types of signal-quality characteristics are different types of signal-quality characteristics and each having a different functional dependence on a combination of signal and noise associated with the received wireless target-signal; generating, via the one or more processors, an interference signature associated with the received wireless target-signal for each of the scanned orientations of the antenna assembly, each interference signature including a correlation of the attained first signal-quality characteristic and the second signal-quality characteristic; analyzing, via the one or more processors, the generated interference signature of each scanned orientation of the antenna assembly to determine a change or degradation in the correlation of the interference signature; and adjusting, via the one or more processors, the preferred orientation of the antenna assembly to another orientation based on the analysis of the interference signatures, thereby reducing degradation of the wireless target-signal received at the mobile vehicle.

Aspect 6. The method of aspect 5, wherein the antenna assembly includes a receive (RX) aperture and a transmit (TX) aperture, the method further comprising: initiating, via the one or more processors, a mode of operation of the antenna assembly wherein the orientation of the receive (RX) aperture is controlled independently of the transmit (TX) aperture; and the scanning the antenna assembly through a plurality of orientations includes independently adjusting the receive (RX) aperture to each of the plurality of orientations without affecting the transmit (TX) aperture.

Aspect 7. The method of any of aspects 5-6, wherein the scanning the antenna assembly includes a sequence, pattern, or geometric shape.

Aspect 8. The method of aspect 7, wherein the geometric shape includes a triangle, square, circle, arc, line, pentagon, and/or hexagon.

Aspect 9. The method of any of aspects 5-8, wherein the first signal-quality characteristic type is a signal-to-noise ratio (SNR), and the second signal-quality characteristic type is a received signal strength (RSS).

Aspect 10. The method of any of aspects 5-9, wherein the first and second signal-quality characteristic types are one of a signal-to-noise ratio (SNR), a received signal strength (RSS), a signal-plus-noise-to-noise ratio ((S+N)/N), or a signal-to-interference-noise ratio (SNIR).

Aspect 11. A system of reducing degradation of wireless communication with a mobile vehicle, the system comprising: one or more processors coupled to the mobile vehicle; a memory coupled to the one or more processors; an antenna assembly coupled to the one or more processors and attached to the mobile vehicle, the antenna assembly including a preferred orientation, a receive (RX) aperture, and a transmit (TX) aperture; and a set of instructions stored on the memory, which when executed by the one or more processors; causes the system to: scan the antenna assembly through at least one of orientation of the antenna assembly; receive a wireless target-signal at each of the scanned orientations of the antenna assembly; attain a first type of signal-quality characteristic of the received wireless target-signal at each of the scanned orientations, the first type of signal-quality characteristic being indicative of a signal quality; attain a second type of signal-quality characteristic of the received wireless target-signal at each of the scanned orientations, the second type of signal-quality characteristic being indicative of a signal quality, wherein the first and second types of signal-quality characteristics are different types of signal-quality characteristics and each having a different functional dependence on a combination of signal and noise associated with the received wireless target-signal; generate an interference signature associated with the received wireless target-signal for at least one of the scanned orientations of the antenna assembly, each interference signature including a correlation of the attained first signal-quality characteristic and the second signal-quality characteristic; analyze the generated interference signature for at least one of the scanned orientation of the antenna assembly to determine a change or degradation in the correlation of the interference signature; and adjust the preferred orientation of the antenna assembly to another orientation based on the analysis of the interference signatures, thereby reducing degradation of the wireless target-signal received at the mobile vehicle.

Aspect 12. The system of aspect 11, wherein the set of instructions further comprising: initiate a mode of operation of the antenna assembly wherein the orientation of the receive (RX) aperture is controlled independently of the transmit (TX) aperture; and wherein the scan the antenna assembly through at least one orientation includes independently adjusting the receive (RX) aperture to each of the at least one orientation without affecting the transmit (TX) aperture.

Aspect 13. The system of any one of aspects 11-12, wherein the scan the antenna assembly includes a sequence, pattern, or geometric shape.

Aspect 14. The system of aspect 13, wherein the geometric shape includes a triangle, square, circle, arc, line, pentagon, and/or hexagon.

Aspect 15. The system of any one of aspects 11-14, wherein the first signal-quality characteristic type is a signal-to-noise ratio (SNR), and the second signal-quality characteristic type is received signal strength (RSS).

Aspect 16. The system of any one of aspects 11-15, wherein the first and second signal-quality characteristic types are one of a signal-to-noise ratio (SNR), a received signal strength (RSS), a signal-plus-noise-to-noise ratio ((S+N)/N), or a signal-to-interference-noise ratio (SNIR).

What is claimed is:

1. A method of reducing degradation of wireless communication with a mobile vehicle, the method comprising:
    receiving, via an antenna assembly including a preferred orientation and coupled to the mobile vehicle, a wireless target-signal;
    attaining, via one or more processors coupled to the antenna assembly, a first type of signal-quality characteristic of the received wireless target-signal, the first type of signal-quality characteristic being indicative of a signal quality;
    attaining, via the one or more processors, a second type of signal-quality characteristic of the received wireless target-signal, the second type of signal-quality characteristic being indicative of a signal quality, wherein the first and second types of signal-quality characteristics are different types of signal-quality characteristics and each having a different functional dependence on a combination of signal and noise associated with the received wireless target-signal;
    generating, via the one or more processors, an interference signature associated with the received wireless target-signal and the preferred orientation of the antenna assembly, the interference signature including a correlation of the attained first signal-quality characteristic and the second signal-quality characteristic;
    analyzing, via the one or more processors, the generated interference signature to determine a change or degradation in the correlation of the first and second signal-quality characteristics; and
    adjusting, via the one or more processors, the preferred orientation of the antenna assembly to another orientation based on the analysis of the interference signature, thereby reducing degradation of the wireless target-signal received at the mobile vehicle.

2. The method of claim 1, wherein the antenna assembly includes a receive (RX) aperture and a transmit (TX) aperture, the method further comprising:
    initiating, via the one or more processors, a mode of operation of the antenna assembly based on the analysis of the interference signature, wherein the orientation of the receive (RX) aperture is controlled independently of the transmit (TX) aperture; and
    the adjusting the preferred orientation of the antenna assembly includes independently adjusting the receive (RX) aperture to another orientation without affecting the transmit (TX) aperture.

3. The method of claim 1, wherein the first signal-quality characteristic type is a signal-to-noise ratio (SNR), and the second signal-quality characteristic type is a received signal strength (RSS).

4. The method of claim 1, wherein the first and second signal-quality characteristic types are one of a signal-to-noise ratio (SNR), a received signal strength (RSS), a signal-plus-noise-to-noise ratio ((S+N)/N), or a signal-to-interference-noise ratio (SNIR).

5. A method of reducing degradation of wireless communication with a mobile vehicle, the method comprising:
    scanning, via an antenna assembly including a preferred orientation and coupled to the mobile vehicle, the antenna assembly through a plurality of orientations;
    receiving, via one or more processors coupled to the antenna assembly, a wireless target-signal at each of the plurality of orientations;
    attaining, via the one or more processors, a first type of signal-quality characteristic of the received wireless target-signal at each of the scanned orientations, the first type of signal-quality characteristic being indicative of a signal quality;
    attaining, via the one or more processors, a second type of signal-quality characteristic of the received wireless target-signal at each of the scanned orientations, the second type of signal-quality characteristic being indicative of a signal quality, wherein the first and second types of signal-quality characteristics are different types of signal-quality characteristics and each having a different functional dependence on a combination of signal and noise associated with the received wireless target-signal;
    generating, via the one or more processors, an interference signature associated with the received wireless target-signal for each of the scanned orientations of the antenna assembly, each interference signature including a correlation of the attained first signal-quality characteristic and the second signal-quality characteristic;
    analyzing, via the one or more processors, the generated interference signature of each scanned orientation of the antenna assembly to determine a change or degradation in the correlation of the interference signature; and
    adjusting, via the one or more processors, the preferred orientation of the antenna assembly to another orientation based on the analysis of the interference signatures, thereby reducing degradation of the wireless target-signal received at the mobile vehicle.

6. The method of claim 5, wherein the antenna assembly includes a receive (RX) aperture and a transmit (TX) aperture, the method further comprising:
    initiating, via the one or more processors, a mode of operation of the antenna assembly wherein the orientation of the receive (RX) aperture is controlled independently of the transmit (TX) aperture; and
    the scanning the antenna assembly through a plurality of orientations includes independently adjusting the receive (RX) aperture to each of the plurality of orientations without affecting the transmit (TX) aperture.

7. The method of claim 5, wherein the scanning the antenna assembly includes a sequence, pattern, or geometric shape.

8. The method of claim 7, wherein the geometric shape includes a triangle, square, circle, arc, line, pentagon, and/or hexagon.

9. The method of claim 5, wherein the first signal-quality characteristic type is a signal-to-noise ratio (SNR), and the second signal-quality characteristic type is a received signal strength (RSS).

10. The method of claim 5, wherein the first and second signal-quality characteristic types are one of a signal-to-noise ratio (SNR), a received signal strength (RSS), a signal-plus-noise-to-noise ratio ((S+N)/N), or a signal-to-interference-noise ratio (SNIR).

11. A system of reducing degradation of wireless communication with a mobile vehicle, the system comprising:
  one or more processors coupled to the mobile vehicle;
  a memory coupled to the one or more processors;
  an antenna assembly coupled to the one or more processors and attached to the mobile vehicle, the antenna assembly including a preferred orientation, a receive (RX) aperture, and a transmit (TX) aperture; and
  a set of instructions stored on the memory, which when executed by the one or more processors; causes the system to:
    scan the antenna assembly through at least one orientation of the antenna assembly;
    receive a wireless target-signal at each of the scanned at least one orientation of the antenna assembly;
    attain a first type of signal-quality characteristic of the received wireless target-signal at each of the scanned at least one orientation of the antenna assembly, the first type of signal-quality characteristic being indicative of a signal quality;
    attain a second type of signal-quality characteristic of the received wireless target-signal at each of the scanned at least one orientation of the antenna assembly, the second type of signal-quality characteristic being indicative of a signal quality, wherein the first and second types of signal-quality characteristics are different types of signal-quality characteristics and each having a different functional dependence on a combination of signal and noise associated with the received wireless target-signal;
    generate an interference signature associated with the received wireless target-signal for at least one of the scanned at least one orientation of the antenna assembly, each interference signature including a correlation of the attained first signal-quality characteristic and the second signal-quality characteristic;
    analyze the generated interference signature for the at least one of the scanned at least one orientation of the antenna assembly to determine a change or degradation in the correlation of the interference signature; and
    adjust the preferred orientation of the antenna assembly to another orientation based on the analysis of the interference signature for the at least one of the scanned at least one orientation of the antenna assembly, thereby reducing degradation of the wireless target-signal received at the mobile vehicle.

12. The system of claim 11, wherein the set of instructions further comprising:
  initiate a mode of operation of the antenna assembly wherein the orientation of the receive (RX) aperture is controlled independently of the transmit (TX) aperture; and wherein
  the scan the antenna assembly through at least one orientation includes independently adjusting the receive (RX) aperture to each of the at least one orientation without affecting the transmit (TX) aperture.

13. The system of claim 11, wherein the scan the antenna assembly includes a sequence, pattern, or geometric shape.

14. The system of claim 13, wherein the geometric shape includes a triangle, square, circle, arc, line, pentagon, and/or hexagon.

15. The system of claim 11, wherein the first signal-quality characteristic type is a signal-to-noise ratio (SNR), and the second signal-quality characteristic type is a received signal strength (RSS).

16. The system of claim 11, wherein the first and second signal-quality characteristic types are one of a signal-to-noise ratio (SNR), a received signal strength (RSS), a signal-plus-noise-to-noise ratio ((S+N)/N), or a signal-to-interference-noise ratio (SNIR).

* * * * *